3,288,741
GLYCOL AND ACID SALT TREATMENT FOR INCREASING THE PARTICLE SIZE OF SYNTHETIC RUBBER LATEX
Shang-I Cheng, Avon Lake, Ohio, assignor to The B. F. Goodrich Company, New York, N.Y., a corporation of New York
No Drawing. Filed Aug. 30, 1963, Ser. No. 305,813
11 Claims. (Cl. 260—29.7)

This invention relates to increasing the particle size of synthetic rubber latices and more particularly pertains to a process for increasing the particle size of rubbery polymers of conjugated dienes in latices containing an anionic surface-active dispersing agent, which method comprises mixing with the latex both a polyalkylene glycol and a water-soluble ammonium salt of a carboxylic acid.

The synthetic rubber latices produced by the well-known, conventional, relatively short polymerization cycle (e.g. 10 to 40 hours) techniques in emulsified aqueous medium are composed of rubber polymer particles generally having an average diameter within the range of about 300 to 1000 Angstrom units. The solids contents of the latices generally are between 25 and 50%. In some operations with synthetic rubber latex, such as in the production of foamed rubber and in coating applications, it is necessary to concentrate the latex to a solids content of around 60 to 70%. Usually, the concentrating of the latex is accomplished by evaporating water therefrom or by creaming techniques. After the latices are concentrated, those containing small particles exhibit very high viscosities causing difficulties in handling. Latices of comparable concentration, but with larger particles, are considerably less viscous. Consequently, many systems, mechanical and chemical, have been developed for increasing the particle size of synthetic rubber latices. An example of a mechanical method is the freeze agglomeration method described in U.S. Patent No. 3,031,427. The chemical methods generally involve adding an electrolyte to the latex to partially neutralize the stabilizing effects of the soaps therein. A major disadvantage of many of the known electrolytes is their tendency to cause undesirable coagulation of a relatively large portion of the latex.

It is, therefore, the object of this invention to provide a new method for increasing the size of the dispersed polymer particles of a synthetic rubber latex while concurrently causing the formation of a negligible or very small amount of coagulum therein. This is accomplished by a process which comprises mixing with the latex a combination of additives comprising (A) at least 0.05 part, per 100 parts of rubber solids, of at least one polyalkylene glycol or polyepichlorohydrin glycol having an average molecular weight within the range of about 300 to about 7500, and (B) at least 1 part, per 100 parts of rubber solids, of at least one ammonium salt of a carboxylic acid having 1 to 5 carbon atoms.

The synthetic rubber latex that may be treated according to the present invention is an aqueous emulsion polymerizate of one or more 1,3-butadienes having 4 to 6 carbon atoms, for example butadiene-1,3, 2-methyl-butadiene-1,3, piperylene and 2,3-dimethyl-butadiene-1,3. Preferred are the rubbery copolymers of said conjugated dienes, especially butadiene-1,3, with up to 45% by weight of the copolymer of (A) an aryl olefin such as styrene, vinyl toluene, alpha-methyl styrene, chlorostyrene, dichlorostyrene and vinyl naphthalene, or (B) a monoolefinically unsaturated nitrile, such as acrylonitrile and methacrylonitrile. Most preferred as the materials for treatment in accordance with this invention are the SBR latices, i.e., emulsions of rubbery copolymers of 70 to 80% butadiene-1,3 and 20 to 30% styrene; and the nitrile rubber latices, i.e., 55 to 80% butadiene and 20 to 45% acrylonitrile, preferably 60 to 67% butadiene and 33 to 40% acrylonitrile. The nitrile rubber latices are particularly adaptable to the method of this invention. In addition, the copolymers (A) and (B), as above defined, also may contain up to 10% by weight, based on the combined weight of the butadiene-1,3 and the aryl olefin or nitrile, of one or more other monoolefinically unsaturated (vinylidene) monomers copolymerizable therewith. Representative of such monomers containing a single $CH_2C=\langle$ group are acrylic acid and methacrylic acid, the alkyl acrylates and methacrylates, the vinyl esters and the vinyl ethers and the like. The preferred copolymerizable monomers of this type useful in minor proportions in the butadiene copolymer latices are acrylic and methacrylic acid.

The synthetic rubber latices may be prepared by conventional processes well known in the art such as, for example, where the polymerizable monomeric compounds are emulsified in an aqueous medium by means of a water-soluble, anionic surface active agent, and the polymerization carried out at a suitable controlled temperature in the presence of a suitable catalyst and/or other regulating materials and additives. The latices will normally contain from 2% to 10%, sometimes as much as 15%, based on the weight of the rubber solids therein, of one or more of the aforesaid anionic surface active dispersing or emulsifying agents. Typical anionic emulsifiers are the conventional soaps, i.e., the alkali-metal, ammonium or amine salts of the higher fatty acids having 8 to 24 carbon atoms or of rosin acids, including hydrogenated, dehydrogenated or disproportioned rosin acids; and the sulfonated or sulfated compounds having the general formulas $Q-SO_3M$ and $Q-O-SO_3M$ where M represents alkali-metal, ammonium, or an amine radical, and Q represents an organic radical containing at least one group having more than 8 carbon atoms. Representative compounds of this type are the alkyl sulfonates, e.g., dodecyl sodium sulfonate, the alkyl sulfates, e.g., sodium dodecyl sulfate, the sulfonated or sulfated ethers of long and short chain aliphatic gorups, the sulfonated alkyl esters of long chain fatty acids, the sulfonated glycol esters of long chain fatty acids, the sulfonated alkyl substituted amides of long chain fatty acids, alkylated aryl sulfonates, e.g., dodecyl benzene sodium sulfonate, alkyl sulfosuccinates, aryl sulfonate-formaldehyde condensation products, e.g., the condensation product of formaldehyde and sodium naphthalene sulfonate, and others. Anionic emulsifiers are described, for instance, under the heading "Surface-Active Agents" in the "Encyclopedia of Chemical Technology" by Kirk and Othmer, Interscience Encyclopedia, New York, New York, volume 13 (1950), pages 513–528, and many are listed in the 1963 edition of the report "Detergents and Emulsifiers," John W. McCutcheon, Inc., Morristown, New Jersey.

The polyalkylene glycols embodied in the process, also known as polyglycols and polyoxyalkylene glycols, are ordinarily made by the polymerization of a lower alkylene oxide, preferably having from 2 to 4 carbon atoms, i.e., ethylene oxide, propylene oxide and butylene oxide, or by polymerization of mixtures of the aforesaid lower alkylene oxides, especially a mixture of ethylene and propylene oxides. Polyglycols of the type used in the present invention are among those discussed in the Monograph, "Glycols," by G. O. Curme, Jr., and F. Johnston (1952), Rheinhold Publishing Corp., New York, N.Y., pages 176–193 and 277–281; and in the "Encyclopedia of Chemical Technology," volume 7 (1951), particularly pages 257–263. It has also been discovered that polyepichlorohydrin glycols, which are obtained by the polymerization of α-epichlorohdrin (γ-chloropropylene oxide,

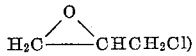

can be employed in the process as stabilizing polymers. Hence, references herein to "polyalkylene glycols" are meant to include polyepichlorohydrin glycols within their attendant explanations.

The polyalkylene glycols useful in the process have an average molecular weight of at least about 300 and the molecular weight may be as high as about 7500. The preferred polymers have an average molecular weight within the range of about 400 to about 3000. The preferred polyglycols may be pictorially represented by the formulae for polyethylene glycols, $HO(C_2H_4O)_xC_2H_4OH$, polypropylene glycols, $HO(C_3H_6O)_xC_3H_6OH$, polybutylene glycols, $HO(C_4H_8O)_xC_4H_8OH$, and polyepichlorohydrin glycols, $HO(C_3H_5ClO)_nC_3H_5ClOH$, where $x$ is an integer such that the average molecular weight of the polymer is from about 300 to about 7500. If the average molecular weight of the polyglycol used is less than the aforesaid lower limit of about 300, it is deficient in retarding coagulum formation during the latex treatment.

The amount of the aforesaid polyalkylene glycol desirably added to the synthetic rubber latex is at least 0.05 part by weight per 100 parts by weight of rubber, with from about 0.1 to about 1.2 phr. being preferred. Larger amounts, e.g., up to 5 phr., may be added to the latex but no useful purpose is served thereby. The combination of additives comprising a small amount of the polyglycol and the ammonium salt of the carboxylic acid is an effective means to obtain rubber particle size increase along with a minimum of latex coagulation.

The ammonium salts of carboxylic acids embodied herein are the water-soluble ammonium salts of the saturated lower aliphatic monobasic and dibasic acids having up to 5 carbon atoms, for example, formic, acetic, propionic, n-butyric, iso-butyric, n-valeric, iso-valeric, pivalic (trimethylacetic), 2-methyl butanoic, oxalic, malonic, succinic, iso-succinic and glutaric acids. Preferred are those ammonium salts of carboxylic acids represented by the structures

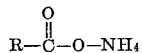

where R is hydrogen and an alkyl radical having from 1 to 4 carbon atoms, and

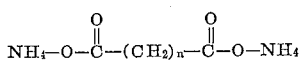

where $n$ is an integer of from 0 to 3. Most preferred in the process are ammonium formate and ammonium acetate.

The amount of the ammonium salt added to the latex is at least about 1 part by weight per hundred parts of rubber and normally is not greater than about 10 phr., usually not more than 5 phr. The desired amount is necessarily slightly in excess of that needed to counteract the complete stabilizing action of the emulsifying or dispersing agent covering the surface of the rubber particles in the feed latex. Where there are latices containing equal amounts of rubber solids and emulsifier, the one having the smaller size particles will have greater rubber surface area covered by the emulsifier, and therefore will require proportionately more ammonium salt to effect equal particle size increase. An undue excess of the ammonium salt added to the latex causes high coagulum formation despite the presence of the polyalkylene glycol. The optimum amount of ammonium salt for a particular latex is easily determined by merely conducting a series of simple particle size increase experiments in accordance with this invention, using progressively greater incremental charges of salt until the desired level of particle size increase in conjunction with minimal coagulum formation is ascertained.

According to the process of this invention, the polyalkylene glycol is advantageously mixed with the synthetic rubber latex prior to the addition to the latex of the ammonium salt. This technique is much preferred to simultaneous mixing, and very much preferred to first adding the ammonium salt and then the polyalkylene glycol. It has been found that initial admixture of the polyglycol with the latex followed by mixing the ammonium salt therein results in about the same increase in particle size as in the other sequences of addition, however, there is less coagulum formed. The polyalkylene glycol and ammonium salt may each be charged to the latex in their natural form, but it is preferred, particularly in the case of the salt, to add them as water solutions, for example as mixtures containing 5 to 25 parts of water per part of additive.

The mixing of the latex, polyalkylene glycol and water-soluble ammonium salt is aided by subjecting the said components to mild but thorough agitation in order to insure complete and intimate mixing, but the stirring should not be so vigorous as to cause any coagulation, since most latices are unstable when contacted by high shearing forces. The treatment temperature is within the range of about 25 to 90° C., preferably 40 to 70° C. The increase in particle size appears to be relatively greater at the higher temperatures, however, as the temperature increases in the range of greater than 50° C., the coagulum formation tends to increase. The time of treatment is not critical and from 30 to 120 minutes are more than adequate.

The pH of the latex before treatment has some effect on the results of the method. The most favorable pre-treatment pH range, generally speaking, is from about 8 to 10.5, although a pH of from 4 to 11 is operable. It has been found, however, that at low pH, coagulum formation is comparatively high while at high pH, the particle size increase is somewhat less in comparison. The pH of a latex may be adjusted by the addition of small amounts of inorganic bases, such as sodium hydroxide and potassium hydroxide, or inorganic or organic acids, such as sulfuric acid, phosphoric acid, acetic acid and formic acid. The pre-treatment pH that is most desired depends to a large extent on the particular synthetic rubber latex formulation to which the method is applied.

In general, the particle size increase achieved by treating the synthetic rubber latex according to the instant process is at least about 40%, but ordinarily will be from about 100 to 250%. At the same time the amount of new coagulum formed in the latex is generally less than about 5% by weight of the rubber solids.

The following examples are presented to illustrate and clarify the invention. All amounts of ingredients are in parts by weight unless otherwise indicated. The sizes of the rubber particles in the latices were determined using an electron microscope. In the tables of data, the symbol (—) means that the particular measurement was not made. For the sake of brevity in the tables, and elsewhere, symbols and abbreviations are used to designate various materials and units in accordance with the following nomenclature.

| | |
|---|---|
| Phr. | Parts by weight of additive per 100 parts by weight of rubber solids. |
| A. | Angstrom units. |
| PEG | Polyethylene glycol. |
| PPG | Polypropylene glycol. |
| PBG | Polybutylene glycol. |
| PECG | Polyepichlorohydrin glycol. |
| PVA | Polyvinyl alcohol. |
| NH₄Ac | Ammonium acetate. |

*Example 1*

In this first example, experiments concerned with increasing the particle size of a synthetic rubber latex in accordance with the present invention were performed on a latex of a nitrile rubber, a copolymer of 67% butadiene-1,3 and 33% acrylonitrile. The latex, which was comprised of about 57% rubber solids having an average par- No. 14 demonstrates that there is comparatively high coagulum formation with a polyalkylene glycol of low molecular weight.

TABLE A

| Experiment | Polyalkylene Glycol | | NH₄Ac, phr. | Treated Latex | | |
|---|---|---|---|---|---|---|
| | Phr. | Ave. Molecular Weight | | Ave. Particle Diameter, A. | Increase in Ave. Particle size, Percent | Coagulum Formed, Percent of Total Solids |
| 1 | 0 | | 0 | 1,390 | 44 | 0 |
| 2 | 0 | | 1.5 | 2,473 | 156 | 9.3 |
| 3 | 0.5 PEG ¹ | 600 | 0 | 1,266 | 31 | 0.05 |
| 4 | do | 600 | 1.0 | 1,349 | 40 | 0.2 |
| 5 | do | 600 | 1.25 | 2,006 | 108 | 0.8 |
| 6 | do | 600 | 1.5 | 2,381 | 147 | 1.2 |
| 7 | do | 600 | 2.0 | 2,451 | 154 | 4.4 |
| 8 | 1.0 PEG ¹ | 600 | 1.5 | 1,911 | 98 | 0.9 |
| 9 | 0.5 PEG ² | 400 | 1.25 | 1,851 | 92 | 2.0 |
| 10 | 0.5 PPG ³ | 3,000 | 1.5 | 1,856 | 93 | 4.4 |
| 11 | 0.5 PBG ⁴ | 2,000 | 1.25 | 1,845 | 91 | 0.5 |
| 12 | 0.5 PBG ⁵ | 500 | 1.25 | 2,758 | 186 | 2.0 |
| 13 | 0.5 PECG ⁶ | 450 | 1.25 | 2,177 | 126 | 2.0 |
| 14 | 0.5 PEG ⁷ | 200 | 1.5 | 2,451 | 154 | 10.9 |
| 15 | 0.5 PEG ⁸ | 1,000 | 1.25 | 2,240 | 132 | 2.3 |
| 16 | 0.5 PEG ¹ | 600 | *1.25 | 2,188 | 127 | 0.6 |

NOTES:
¹ "Pluracol E-600," sold by Wyandotte Chemical Company.
² "Pluracol E-400," sold by Wyandotte Chemical Company.
³ "Pluronic L-64," sold by Wyandotte Chemical Company.
⁴ "B-2000 Polyglycol," sold by Dow Chemical Company.
⁵ "B-500 Polyglycol," sold by Dow Chemical Company.
⁶ "166-450 Polyglycol," sold by Dow Chemical Company.
⁷ "Pluracol E-200," sold by Wyandotte Chemical Company.
⁸ "Pluracol E-1000," sold by Wyandotte Chemical Company.
*Ammonium formate instead of NH₄Ac.

ticle size of 964 Angstrom units, contained, per 100 parts of the rubber, one part of sodium pyrophosphate (electrolyte), and 5 parts of anionic emulsifying agents: 2 parts of the sodium salts of rosin acids ("Dresinate 731," product Hercules Powder Co.), one part of polymerized sodium salts of alkyl naphthalene sulfonic acid ("Daxad 15," product of Dewey and Almy Chemical Division of W. R. Grace & Co.), and 2 parts of potassium oleate. The latex contained a negligible amount of coagulated solids. The pH of the mixture was about 8.7.

In each experiment, 300 parts of the latex were diluted with 60 parts of water, and a measured amount of the polyalkylene glycol was then mixed therewith. The latex was heated to 50° C. in a water bath and a measured amount of the ammonium salt of a monocarboxylic acid was added slowly as a 1 to 7.5% water solution while the mixture was being agitated. The latex was held for 1 hour at 50° C. with agitation; at the end of this period, particle size, total solids content and coagulum content measurements were made. The control sample, experiment No. 1, was subjected to the stirring for one hour at 50° C. but no addition of chemicals was made thereto. The latices, after treatment, contained from about 40 to about 45% of rubber solids. Pertinent data are presented in Table A. It is seen that the combination of the polyalkylene glycol and the appropriate amount of ammonium salt are required to give an appreciable particle size increase in conjunction with a small coagulum formation. Experiment

*Example II*

This series of experiments compares the relative effectiveness of the agglomeration system of this invention with systems employing either a different stabilizing polymer, or a different ammonium salt (ammonium carbonate), or both, at identical concentrations. The synthetic rubber latex upon which the tests were made was substantially the same material described in Example I except that the average particle size was 991 Angstrom units. The agglomeration technique was as follows: The stabilizing polymer in 4 parts of water was mixed with 30 parts of latex at 50° C. The ammonium salt dissolved in 6 parts of water was then added slowly to the latex with agitation. The latex was stirred for one hour at 50° C. prior to measurement of the particle size of the treated rubber emulsion. The data are given in Table B. The efficiency of the present process (Experiment 17) is readily apparent.

TABLE B

| Experiment | Ammonium Salt, 2.0 phr. | Stabilizing Polymer, 0.5 phr. | Treated Latex | |
|---|---|---|---|---|
| | | | Ave. Particle Diameter of Treated Latex, A. | Increase in Ave. Particle Size, Percent |
| 17 | NH₄Ac | PEG ¹ | 2,248 | 127 |
| 18 | (NH₄)₂CO₃ | PEG ¹ | 1,066 | 8 |
| 19 | (NH₄)₂CO₃ | PVA ² | 1,081 | 9 |

NOTES:
¹ "Pluracol E-600," molecular wt.=600.
² Polyvinyl alcohol having a viscosity of 8 cps. as a 4% aqueous solution at 20° C. (Brookfield viscosity, spindle No. 1, 60 r.p.m.): "Elvanol 70-05," sold by E. I. du Pont de Nemours and Co.

*Example III*

In this series of experiments, the synthetic rubber latex and operating procedure, i.e., the method of addition of agglomerating agents and the treatment temperature and time, were the same as in Example I. After treatment, the latices contained about 41 to 44% of rubber solids. Experiment 7, which embodies the method of the present invention, is included for purposes of comparison in the summary of results presented in Table C.

It is seen that (1) at equal concentrations of the ammonium salt of the carboxylic acid, the polyalkylene glycol inhibits coagulum formation better than polyvinyl alcohol and (2) that the ammonium salt-polyalkylene glycol system embodied herein requires less salt and causes less coagulum than the inorganic ammonium salt-polyvinyl alcohol system giving about the same degree of particle size increase.

erage particle size was 447 A. The latex contained about 3 parts of potassium fatty acid soap emulsifier per 100 parts of rubber. The agglomeration additives were 0.5 phr. of polyethylene glycol (molecular weight=600) and 1.5 to 2.5 phr. of ammonium acetate. The treated latices contained 42 to 44% rubber solids and about 2% coagulum; the increase in particle size was about 40 to 70%.

TABLE C

| Experiment | Ammonium salt | phr. | Stabilizing Polymer, 0.5 phr. | Treated Latex | |
|---|---|---|---|---|---|
| | | | | Ave. Particle Diameter, A. | Coagulum Formed, percent of total solids |
| 7 | NH$_4$Ac | 2.0 | PEG [1] | 2,451 | 4.4 |
| 20 | NH$_4$Ac | 2.0 | PVA [2] | | 9.4 |
| 21 | (NH$_4$)$_2$CO$_3$ | 4.0 | PVA [2] | 2,366 | 16.0 |

NOTES:
[1] "Pluracol E-600," molecular wt.=600.
[2] "Elvanol 70-05," Brookfield viscosity (spindle No. 1 at 60 rpm)=8 cps. as 4% aqueous solution at 20° C.

*Example IV*

The latex with which the experiments of this example were conducted was the emulsion of a copolymer of 66.7% butadiene-1,3 and 33.3% acrylonitrile wherein there was about 41% of rubber solids having an average particle size of 560 A. The emulsion, which had a pH of 9.2, contained the following amounts of emulsifiers and dispersing agents and other additives:

| | Parts |
|---|---|
| Sodium stearate | 5.0 |
| Potassium salts of rosin acids [1] | 4.0 |
| Polymerized sodium salts of alkyl naphthalene sulfonic acids [2] | 1.0 |
| Organic chelating agent [3] | 0.2 |
| Sodium sulfate | 0.23 |

[1] "Dresinate 214," product of Hercules Powder Co.
[2] "Daxad 15."
[3] "Versene Fe-3," product of Dow Chemical Co.

The data for the tests are presented in Table D. The pH of the latex was first adjusted to about 8.5 by adding some dilute acetic acid solution thereto, then a measured amount of polyethylene glycol, molecular weight 600 ("Pluracol E–600"), was mixed therewith and then the ammonium acetate was added as a water solution. The stirred latex mixture was held for 1 hour at 50° C. The treated latex contained 36 to 39% of solids. It is seen in Table D that at least 1.5 phr. of the ammonium salt were needed before a pronounced increase in rubber particle size was effected, due to the relatively high level of emulsifier in the latex.

*Example VI*

As aforementioned, it is desirable to mix the polyalkylene glycol with the latex prior to the introduction of the ammonium salt into the mixture. To two separate samples of the nitrile rubber latex described in Example I were added 0.5 part of polyethylene glycol (mol. wt.=600) and 2 parts of ammonium acetate per 100 parts of rubber. The emulsions were agitated at 50° C. for about an hour. In one case, the polyethylene glycol had been added individually to the stirred latex and then the NH$_4$Ac solution added, and in the other experiment, the two additives had been charged simultaneously as a mixture in water. The treated latex contained 41.3 and 43% solids which had an average particle size of 2,451 and 2,467 A., respectively, not a significant difference. But the latter treated latex contained 8% coagulum, based on the rubber solids, while the former latex had only slightly more than 4% coagulum.

*Example VII*

This series of experiments was designed to show the effect of the pre-treatment pH of a particular synthetic rubber latex on the final results of the treatment for increasing particle size. The latex and procedural techniques were substantially the same as in Example I except that the original pH (8.7) was in three instances, either decreased by adding a solution of acetic acid or increased by adding sodium hydroxide solution. The pH adjustment was followed by the addition, in the said order, of

TABLE D

| Experiment | NH$^4$AC, phr. | PEG, phr. | Treated Latex | | |
|---|---|---|---|---|---|
| | | | Ave. Particle Diameter, A. | Increase in Ave. Particle Size, Percent | Coagulum Formed, Percent of Total Solids |
| 22 | 1.25 | 0.5 | 942 | 68 | 2.2 |
| 23 | 1.25 | 2.5 | 805 | 44 | 1.25 |
| 24 | 1.5 | 0.5 | 1,055 | 89 | 0.3 |
| 25 | 2.0 | 0.5 | 1,236 | 121 | 0.3 |
| 26 | 2.5 | 0.5 | 1,346 | 141 | 0.6 |

*Example V*

The treatment procedures described in Example IV were repeated on a commercial SBR latex (a copolymer of 80% butadiene and 20% styrene) having an initial pH of 9.2 and a solids content of 48% of which the av- 0.5 part of polyethylene glycol (molecular weight=600) and 1.25 parts of ammonium acetate. The data, summarized in Table E, show that particle size increase is minimized at high pH while the coagulum level is raised as the pH is decreased.

TABLE E.—EFFECT OF pH ON PARTICLE SIZE AND COAGULUM CONTENT OF TREATED LATEX

| Experiment | pH of Latex Before Treatment | Treated Latex | | | | |
|---|---|---|---|---|---|---|
| | | pH | Total Solids, Percent | Ave. Particle Diameter, A. | Increase in Ave. Particle Size, Percent | Coagulum Formed, Percent of Total Solids |
| 27 | 7.5 | 8.6 | 41 | 1,952 | 102 | 19.5 |
| 5 | 8.5 | 8.05 | 45 | 2,006 | 108 | 0.8 |
| 28 | 9.5 | 8.20 | 46 | 1,634 | 70 | 0.3 |
| 29 | 10.5 | 8.77 | 43.5 | 1,425 | 48 | 0.7 |

*Example VIII*

This example shows that as the treatment temperature is increased, the final particle size of the rubber is also increased. It is also noted that the amount of coagulation is at a minimum at about 50° C. and increases slightly with rising temperature. The latex employed in these experiments was the nitrile rubber emulsion described in Example I (particle size = 964 A.). The treatment additives were 0.5 part of polyethylene glycol having a molecular weight of 600 and 1.25 parts of ammonium acetate. The latices were held for one hour at the test temperature before measuring the particle size. The results are reported in Table F.

TABLE F.—EFFECT OF TEMPERATURE ON PARTICLE SIZE AND COAGULUM CONTENT OF TREATED LATEX

| Experiment | Treatment Temperature, °C. | Treated Latex | | |
|---|---|---|---|---|
| | | Ave. Particle Diameter, A. | Increase in Ave. Particle Size, Percent | Coagulum Formed, Percent of Total Solids |
| 30 | 25 | 1,563 | 62 | 1.5 |
| 6 | 50 | 2,006 | 108 | 0.77 |
| 31 | 70 | 2,379 | 147 | 5.0 |

It is, of course, understood that the above examples and specific embodiments are merely illustrative and should not be construed to limit the invention, which is subject to various modifications and changes by one skilled in the art within the scope of the appended claims.

I claim:
1. The method of increasing the size of the polymer particles of a synthetic rubber latex comprising the aqueous emulsion polymerizate of 55 to 100 wt. percent of a 1,3-butadiene having 4 to 6 carbon atoms and 0 to 45 wt. percent of a compound copolymerizable with said 1,3-butadiene and selected from the group consisting of aryl olefins, acrylonitrile and methacrylonitrile, whereby the average size of the polymer particles in the latex is increased by at least about 40% and the amount of new coagulum formed therein is less than about 5% based on the weight of the rubber in the latex, which method comprises first mixing with the latex (A) at least 0.05 part of a polyalkylene glycol having an average molecular weight of from about 300 to about 7500 and selected from the group consisting of polyethylene glycol, polypropylene glycol, polybutylene glycol, polyepichlorohydrin glycol and mixtures thereof, and then mixing with the latex (B) from about 1 to 10 parts by weight of an ammonium salt of a carboxylic acid selected from the group consisting of:

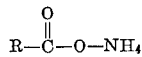

where R is hydrogen and an alkyl radical having from 1 to 4 carbon atoms; and

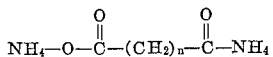

where $n$ is an integer of from 0 to 3; and mixtures of the foregoing ammonium salts, the amounts of the additives (A) and (B) being based on 100 parts by weight of rubber solids in the latex.

2. The method according to claim 1 wherein the pH of the synthetic rubber latex is from about 8 to 10.5, the average molecular weight of the polyalkylene glycol is from about 400 to about 3000, the amount of ammonium salt added is from about 1 to 5 parts, and the mixing of the latex with said additives is at a temperature within the range of about 40° C. to 70° C.

3. The method of claim 2 wherein the ammonium salt is ammonium acetate.

4. The method of increasing the size of the polymer particles of a synthetic rubber latex comprising the aqueous emulsion polymerizates of 70 to 80 wt. percent of butadiene-1,3 and 20 to 30 wt. percent of styrene, whereby the average size of the polymer particles in the latex is increased by at least about 40% and the amount of new coagulum formed therein is less than about 5% based on the weight of the rubber in the latex, which method comprises first mixing with the latex (A) at least 0.05 part of a polyalkylene glycol having an average molecular weight of from about 300 to about 7500 and selected from the group consisting of polyethylene glycol, polypropylene glycol, polybutylene glycol, polyepichlorohydrin glycol and mixtures thereof, and then mixing with the latex (B) from about 1 to 10 parts by weight of an ammonium salt of a carboxylic acid selected from the group consisting of:

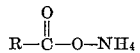

where R is hydrogen and an alkyl radical having from 1 to 4 carbon atoms; and

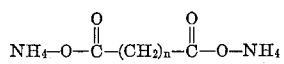

where $n$ is an integer of from 0 to 3; and mixtures of the foregoing ammonium salts, the amounts of the additives (A) and (B) being based on 100 parts by weight of rubber solids in the latex.

5. The method according to claim 4 wherein the pH of the synthetic rubber latex is from about 8 to 10.5, the average molecular weight of the polyalkylene glycol is from about 400 to about 3000, the amount of ammonium salt added is from about 1 to 5 parts, and the mixing of the latex with said additives is at a temperature within the range of about 40° C. to 70° C.

6. The method of claim 5 wherein the ammonium salt is ammonium acetate.

7. The method of increasing the size of the polymer particles of a synthetic rubber latex comprising the aqueous emulsion polymerizate of 55 to 80 wt. percent of butadiene-1,3 and 20 to 45 wt. percent of acrylonitrile, whereby the average size of the polymer particles in the latex is increased by at least about 40% and the amount of new coagulum formed therein is less than about 5% based on the weight of the rubber in the latex, which method comprises first mixing with the latex (A) at least 0.05 part of a polyalkylene glycol having an average molecular weight of from about 300 to about 7500 and selected from the group consisting of polyethylene glycol, polypropylene glycol, polybutylene glycol, polyepichlorohydrin glycol and mixtures thereof, and then mixing with the latex (B) from about 1 to 10 parts by weight of an ammonium salt of a carboxylic acid selected from the group consisting of:

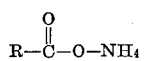

where R is hydrogen and an alkyl radical having from 1 to 4 carbon atoms; and

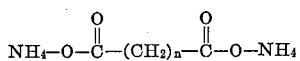

where $n$ is an integer of from 0 to 3; and mixtures of the foregoing ammonium salts, the amounts of the additives (A) and (B) being based on 100 parts by weight of rubber solids in the latex.

8. The method according to claim 7 wherein the pH of the synthetic rubber latex is from about 8 to 10.5, the average molecular weight of the polyalkylene glycol is from about 400 to about 3000, the amount of ammonium salt added is from about 1 to 5 parts, and the mixing of the latex with said additives is at a temperature within the range of about 40° C. to 70° C.

9. The method of claim 8 wherein the ammonium salt is ammonium acetate.

10. The method of claim 8 wherein the ammonium salt is ammonium formate.

11. The method according to claim 7 wherein the polymerizate contains up to 10%, based on the combined weight of butadiene and acrylonitrile, of at least one other monomer copolymerizable therewith and having a single $CH_2=C<$ group.

References Cited by the Examiner

UNITED STATES PATENTS 2,444,801   7/1948   Arundale _____ 260—29.7
2,797,203   6/1957   Barber et al. _____ 260—29.7

MURRAY TILLMAN, *Primary Examiner.*

J. ZIEGLER, *Assistant Examiner.*